US011935503B1

(12) United States Patent
Ratnasingam et al.

(10) Patent No.: US 11,935,503 B1
(45) Date of Patent: Mar. 19, 2024

(54) SEMANTIC-BASED IMAGE MAPPING FOR A DISPLAY

(71) Applicant: Apple Inc., Cupertino, CA (US)

(72) Inventors: Sivalogeswaran Ratnasingam, San Jose, CA (US); Anselm Grundhoefer, Campbell, CA (US); Ralf Habel, Cupertino, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 17/225,366

(22) Filed: Apr. 8, 2021

Related U.S. Application Data

(60) Provisional application No. 63/031,400, filed on May 28, 2020.

(51) Int. Cl.
*G09G 5/10* (2006.01)

(52) U.S. Cl.
CPC ....... *G09G 5/10* (2013.01); *G09G 2320/0646* (2013.01); *G09G 2354/00* (2013.01); *G09G 2360/141* (2013.01); *G09G 2360/144* (2013.01)

(58) Field of Classification Search
None
See application file for complete search history.

(56) References Cited

U.S. PATENT DOCUMENTS

| 8,957,916 B1* | 2/2015 | Hedman | G09G 3/003 345/7 |
|---|---|---|---|
| 2017/0343809 A1* | 11/2017 | Benesh | G02B 27/017 |
| 2020/0349763 A1* | 11/2020 | Chen | G06T 7/73 |

\* cited by examiner

*Primary Examiner* — Andre L Matthews
(74) *Attorney, Agent, or Firm* — Fernando & Partners, LLP

(57) ABSTRACT

A method includes sensing a plurality of luminance values associated with ambient light from a physical environment. The plurality of luminance values quantifies the ambient light arriving at a see-through display. The method includes obtaining a plurality of semantic values respectively associated with a plurality of portions within image data. The plurality of portions includes a first portion of the image data and a second portion of the image data. The method includes identifying a first one of the plurality of semantic values that satisfies a criterion. The first one of the plurality of semantic values is associated with the first portion of the image data. The method includes mapping, based on a function of a portion of the plurality of luminance values, the image data to predetermined display characteristics of the first portion of the image data within a performance threshold.

24 Claims, 15 Drawing Sheets

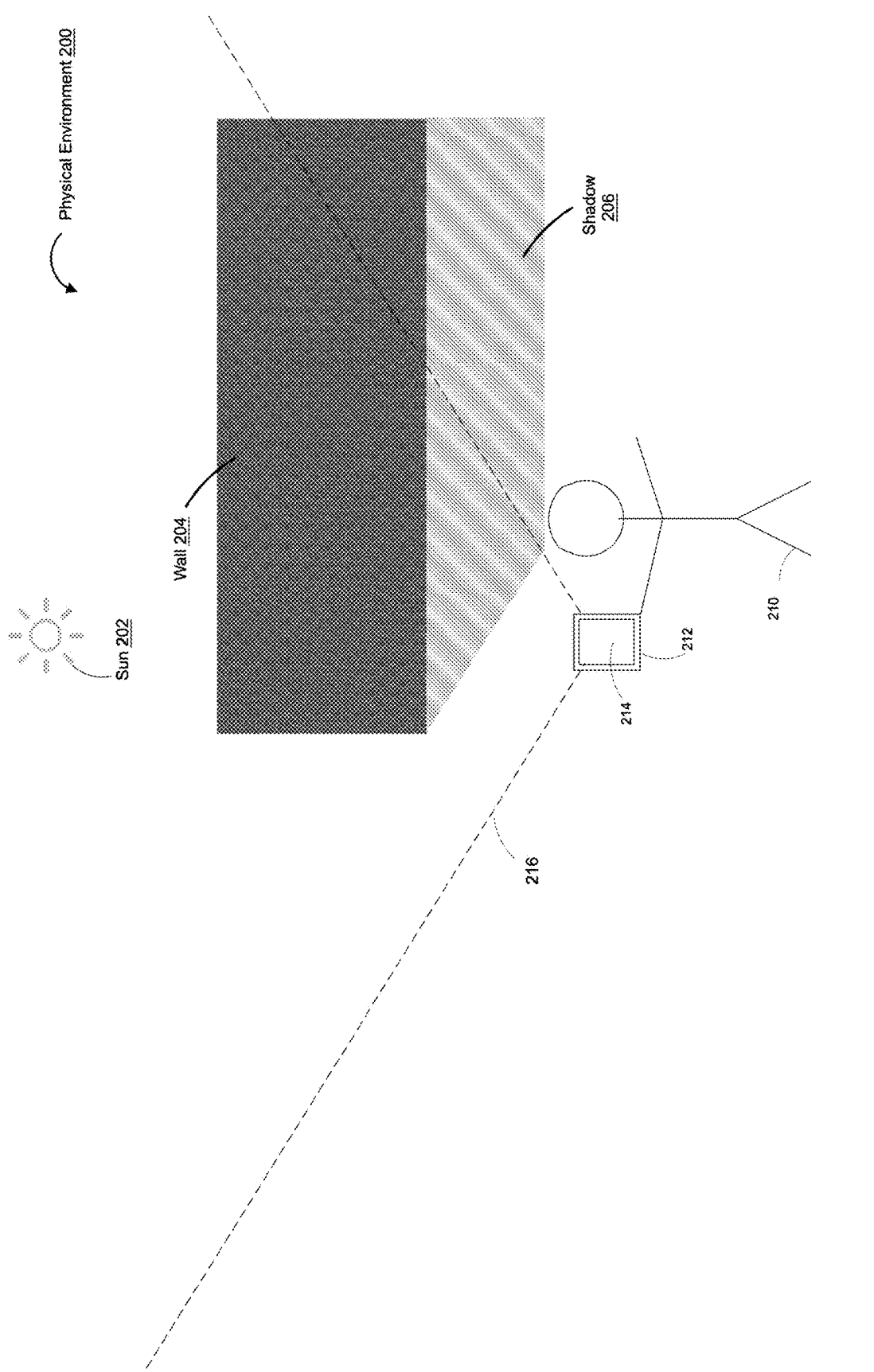

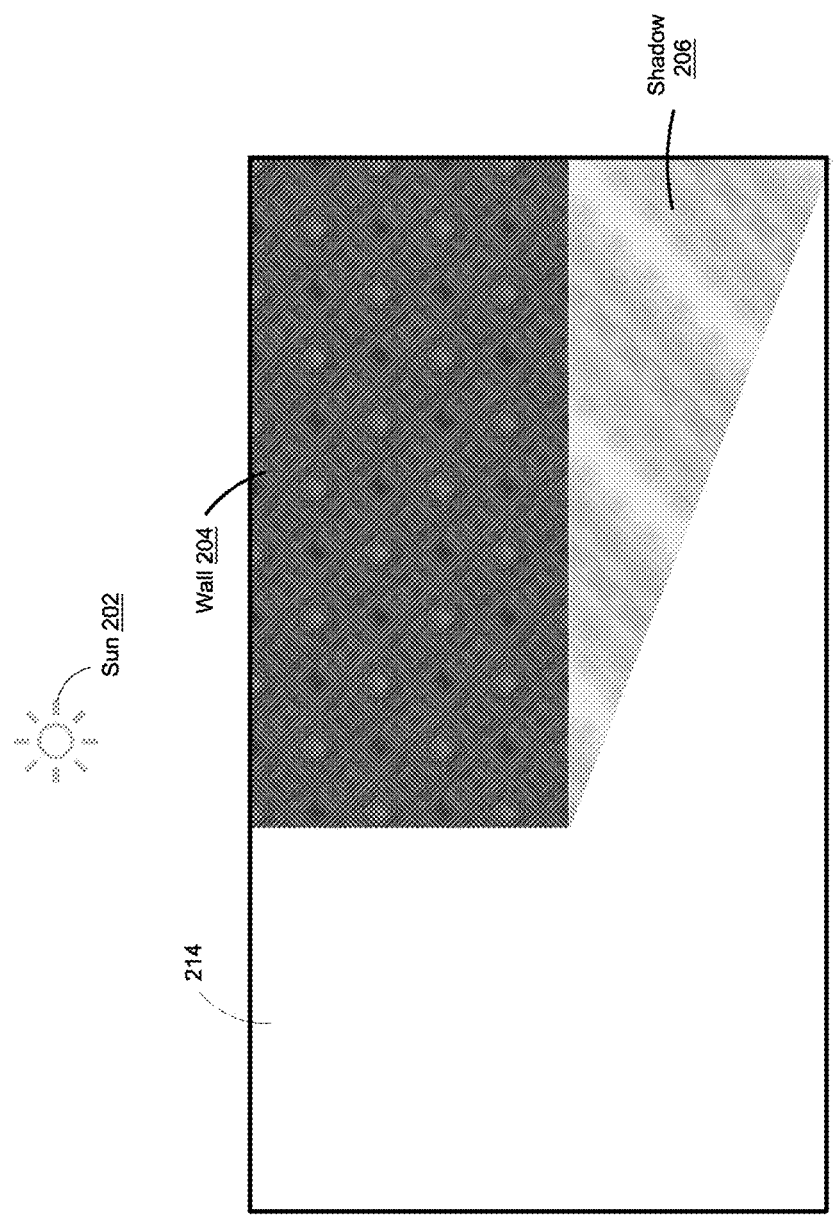

SEMANTIC-BASED IMAGE MAPPING FOR A DISPLAY

CROSS-REFERENCE TO RELATED APPLICATION

This application claims priority to U.S. Provisional Patent App. No. 63/031,400, filed on May 28, 2020, which is hereby incorporated by reference in its entirety.

TECHNICAL FIELD

The present disclosure relates to image mapping, and, in particular, semantic-based image mapping for a display.

BACKGROUND

In augmented reality (AR), computer-generated content is composited with a user's physical environment in order to comingle computer generated visual content with real-world objects. A user may experience AR via an electronic device that includes a see-through display, which, in turn, allows the pass-through of light from the user's physical environment to the user's eyes.

In some circumstances, however, light from the physical environment has a luminance and/or color composition that interferes with computer-generated content in a manner that degrades the AR experience. For example, light from the physical environment results in displayed computer-generated content having a limited contrast level or incorrect color profile. However, previously available see-through display systems do not effectively account for light from the physical environment, resulting in undesirable displayed artifacts.

SUMMARY

In accordance with some implementations, a method is performed at an electronic device with one or more processors, a non-transitory memory, and a see-through display. The method includes sensing a plurality of luminance values associated with ambient light from a physical environment. The plurality of luminance values quantifies the ambient light arriving at the see-through display. The method includes obtaining a plurality of semantic values respectively associated with a plurality of portions within image data. The plurality of portions includes a first portion of the image data and a second portion of the image data. The method includes identifying a first one of the plurality of semantic values that satisfies a criterion. The first one of the plurality of semantic values is associated with the first portion of the image data. The method includes mapping, based on a function of a portion of the plurality of luminance values, the image data to predetermined display characteristics of the first portion of the image data within a performance threshold.

In accordance with some implementations, an electronic device includes one or more processors, a non-transitory memory, and a see-through display. The one or more programs are stored in the non-transitory memory and configured to be executed by the one or more processors and the one or more programs include instructions for performing or causing performance of the operations of any of the methods described herein. In accordance with some implementations, a non-transitory computer readable storage medium has stored therein instructions which when executed by one or more processors of an electronic device, cause the device to perform or cause performance of the operations of any of the methods described herein. In accordance with some implementations, an electronic device includes means for performing or causing performance of the operations of any of the methods described herein. In accordance with some implementations, an information processing apparatus, for use in an electronic device, includes means for performing or causing performance of the operations of any of the methods described herein.

BRIEF DESCRIPTION OF THE DRAWINGS

For a better understanding of the various described implementations, reference should be made to the Description, below, in conjunction with the following drawings in which like reference numerals refer to corresponding parts throughout the figures.

FIGS. 2A-2D are an example of light from a physical environment interfering with display of image data.

SUMMARY

Figure 1:
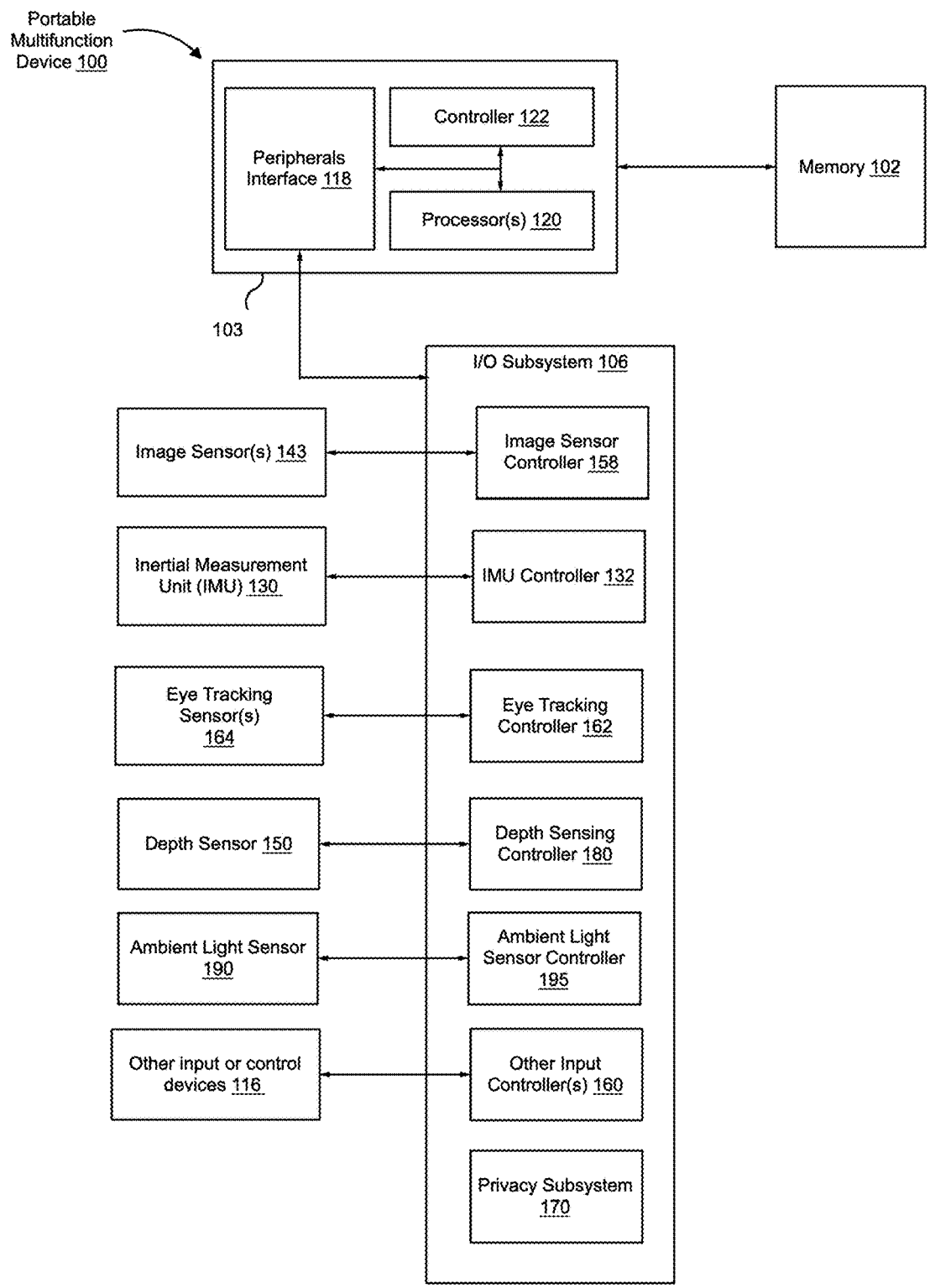
FIG. 1 is a block diagram of an example of a portable multifunction device in accordance with some implementations.

In augmented reality (AR), computer-generated content is composited with a user's physical environment in order to comingle computer generated visual content with real-world objects. A user may experience AR via an electronic device that includes a see-through display, which, in turn, allows the pass-through of light from the user's physical environment to the user's eyes. In some circumstances, however, light from the physical environment has a luminance and/or chromaticity that interferes with computer-generated content in a manner that degrades the AR experience. For example, light from the physical environment limits and distorts perceptual contrast levels between the physical environment and displayed computer-generated content. As another example, chromaticity of the physical environment, such as the presence of predominantly one color, may interfere with the chromaticity of displayed computer-generated content by providing dominant hues that are difficult to mask using additive display methods and hardware. However, conventional color correction methods used in pass-through display systems, such as backlight tinting, are not applicable to a see-through display. Moreover, other color correction methods do not effectively account for light from the physical environment.

By contrast, various implementations disclosed herein provide methods, electronic devices, and systems for semantically mapping a portion of image data to predetermined characteristics of the portion of the image data, based on corresponding luminance values associated with ambient light from a physical environment. To that end, an electronic device, with a see-through display, senses luminance values associated with the ambient light from the physical environment. The ambient light enters the see-through display. The electronic device obtains semantic values respectively associated with portions of image data. For example, the electronic device obtains semantic values of "face" for a face object, "wall" for a background wall, etc. The electronic device identifies a first one of the semantic values that satisfies a criterion, such as an object of interest (e.g., a "face"). The first one of the semantic values is associated with a first portion of the image data. The first portion of the image data has predetermined (e.g., preferred) characteristics, such as a luminance value, chromaticity values (e.g., hue, chroma, saturation), and/or the like. The electronic device maps the image data to the predetermined characteristics, based on a function of a portion of the luminance values. Accordingly, in contrast to other systems, the electronic device accounts for ambient light from a physical environment in order to map image data. Mapping the image data based on characteristics of the ambient light enables the see-through display to display mapped image data that is less adversely affected by the ambient light than image data displayed by other display systems. Thus, the user-experience (e.g., AR experience) is enhanced.

DESCRIPTION

Reference will now be made in detail to implementations, examples of which are illustrated in the accompanying drawings. In the following detailed description, numerous specific details are set forth in order to provide a thorough understanding of the various described implementations. However, it will be apparent to one of ordinary skill in the art that the various described implementations may be practiced without these specific details. In other instances, well-known methods, procedures, components, circuits, and networks have not been described in detail so as not to unnecessarily obscure aspects of the implementations.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described implementations. The first contact and the second contact are both contacts, but they are not the same contact, unless the context clearly indicates otherwise.

The terminology used in the description of the various described implementations herein is for the purpose of describing particular implementations only and is not intended to be limiting. As used in the description of the various described implementations and the appended claims, the singular forms "a", "an", and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes", "including", "comprises", and/or "comprising", when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting", depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]", depending on the context.

A physical environment refers to a physical world that people can sense and/or interact with without aid of electronic devices. The physical environment may include physical features such as a physical surface or a physical object. For example, the physical environment corresponds to a physical park that includes physical trees, physical buildings, and physical people. People can directly sense and/or interact with the physical environment such as through sight, touch, hearing, taste, and smell. In contrast, an extended reality (XR) environment refers to a wholly or partially simulated environment that people sense and/or interact with via an electronic device. For example, the XR environment may include augmented reality (AR) content, mixed reality (MR) content, virtual reality (VR) content, and/or the like. With an XR system, a subset of a person's physical motions, or representations thereof, are tracked, and, in response, one or more characteristics of one or more virtual objects simulated in the XR environment are adjusted in a manner that comports with at least one law of physics. As one example, the XR system may detect head movement and, in response, adjust graphical content and an acoustic field presented to the person in a manner similar to how such views and sounds would change in a physical environment. As another example, the XR system may detect movement of the electronic device presenting the XR environment (e.g., a mobile phone, a tablet, a laptop, or the like) and, in response, adjust graphical content and an acoustic field presented to the person in a manner similar to how such views and sounds would change in a physical environment. In some situations (e.g., for accessibility reasons), the XR system may adjust characteristic(s) of graphical content in the XR environment in response to representations of physical motions (e.g., vocal commands).

There are many different types of electronic systems that enable a person to sense and/or interact with various XR environments. Examples include head mountable systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mountable system may have one or more speaker(s) and an integrated opaque display. Alternatively, a head mountable system may be configured to accept an external opaque display (e.g., a smartphone). The head mountable system may incorporate one or more imaging sensors to capture images or video of the physical environment, and/or one or more microphones to capture audio of the physical environment. Rather than an opaque display, a head mountable system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In some implementations, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

FIG. 1 is a block diagram of an example of a portable multifunction device 100 (sometimes also referred to herein as the "electronic device 100" for the sake of brevity) in accordance with some implementations. The electronic device 100 includes memory 102 (which optionally includes one or more computer readable storage mediums), a memory controller 122, one or more processing units (CPUs) 120, a peripherals interface 118, an input/output (I/O) subsystem 106, an inertial measurement unit (IMU) 130, image sensor(s) 143 (e.g., a camera), a depth sensor 150, eye tracking sensor(s) 164 (e.g., included within a head-mountable device (HMD)), an ambient light sensor 190, and other input or control device(s) 116. In some implementations, the electronic device 100 corresponds to one of a mobile phone, tablet, laptop, wearable computing device, head-mountable device (HMD), head-mountable enclosure (e.g., the electronic device 100 slides into or otherwise attaches to a head-mountable enclosure), or the like. In some implementations, the head-mountable enclosure is shaped to form a receptacle for receiving the electronic device 100 with a display.

In some implementations, the peripherals interface 118, the one or more CPUs 120, and the memory controller 122 are, optionally, implemented on a single chip, such as a chip 103. In some other implementations, they are, optionally, implemented on separate chips.

The I/O subsystem 106 couples input/output peripherals on the electronic device 100 and the other input or control devices 116 with the peripherals interface 118. The I/O subsystem 106 optionally includes an image sensor controller 158, an eye tracking controller 162, and one or more input controllers 160 for other input or control devices, and a privacy subsystem 170. The one or more input controllers 160 receive/send electrical signals from/to the other input or control devices 116. The other input or control devices 116 optionally include physical buttons (e.g., push buttons, rocker buttons, etc.), dials, slider switches, joysticks, click wheels, and so forth. In some alternate implementations, the one or more input controllers 160 are, optionally, coupled with any (or none) of the following: a keyboard, infrared port, Universal Serial Bus (USB) port, stylus, and/or a pointer device such as a mouse. The one or more buttons optionally include an up/down button for volume control of a speaker and/or audio sensor(s). The one or more buttons optionally include a push button. In some implementations, the other input or control devices 116 includes a positional system (e.g., GPS) that obtains information concerning the location and/or orientation of the electronic device 100 relative to a physical environment.

The I/O subsystem 106 optionally includes a speaker and audio sensor(s) that provide an audio interface between a user and the electronic device 100. Audio circuitry receives audio data from the peripherals interface 118, converts the audio data to an electrical signal, and transmits the electrical signal to the speaker. The speaker converts the electrical signal to human-audible sound waves. Audio circuitry also receives electrical signals converted by an audio sensor (e.g., a microphone) from sound waves. Audio circuitry converts the electrical signal to audio data and transmits the audio data to the peripherals interface 118 for processing. Audio data is, optionally, retrieved from and/or transmitted to the memory 102 and/or RF circuitry by the peripherals interface 118. In some implementations, audio circuitry also includes a headset jack. The headset jack provides an interface between audio circuitry and removable audio input/output peripherals, such as output-only headphones or a headset with both output (e.g., a headphone for one or both ears) and input (e.g., a microphone).

The I/O subsystem 106 optionally includes a touch-sensitive display system that provides an input interface and an output interface between the electronic device 100 and a user. A display controller may receive and/or send electrical signals from/to the touch-sensitive display system. The touch-sensitive display system displays visual output to the user. The visual output optionally includes graphics, text, icons, video, and any combination thereof (collectively termed "graphics"). In some implementations, some or all of the visual output corresponds to user interface objects. As used herein, the term "affordance" refers to a user-interactive graphical user interface object (e.g., a graphical user interface object that is configured to respond to inputs directed toward the graphical user interface object). Examples of user-interactive graphical user interface objects include, without limitation, a button, slider, icon, selectable menu item, switch, hyperlink, or other user interface control.

The touch-sensitive display system has a touch-sensitive surface, sensor, or set of sensors that accepts input from the user based on haptic and/or tactile contact. The touch-sensitive display system and the display controller (along with any associated modules and/or sets of instructions in the memory 102) detect contact (and any movement or breaking of the contact) on the touch-sensitive display system and converts the detected contact into interaction with user-interface objects (e.g., one or more soft keys, icons, web pages or images) that are displayed on the touch-sensitive display system. In an example implementation, a point of contact between the touch-sensitive display system and the user corresponds to a finger of the user or a stylus.

The touch-sensitive display system optionally uses LCD (liquid crystal display) technology, LPD (light emitting polymer display) technology, or LED (light emitting diode) technology, although other display technologies are used in other implementations. The touch-sensitive display system and the display controller optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with the touch-sensitive display system.

The user optionally makes contact with the touch-sensitive display system using any suitable object or appendage, such as a stylus, a finger, and so forth. In some implementations, the user interface is designed to work with finger-based contacts and gestures, which can be less precise than stylus-based input due to the larger area of contact of a finger on the touch screen. In some implementations, the electronic device 100 translates the rough finger-based input into a precise pointer/cursor position or command for performing the actions desired by the user.

The I/O subsystem 106 includes the inertial measurement unit (IMU) 130 that may include accelerometers, gyroscopes, and/or magnetometers in order measure various forces, angular rates, and/or magnetic field information with respect to the electronic device 100. Accordingly, according to various implementations, the IMU 130 detects one or more positional change inputs of the electronic device 100, such as the electronic device 100 being shaken, rotated, moved in a particular direction, and/or the like. The IMU may 130 include accelerometers, gyroscopes, and/or magnetometers in order measure various forces, angular rates, and/or magnetic field information with respect to the electronic device 100. Accordingly, according to various implementations, the IMU 130 detects one or more positional change inputs of the electronic device 100, such as the electronic device 100 being shaken, rotated, moved in a particular direction, and/or the like.

The image sensor(s) 143 capture still images and/or video. In some implementations, an image sensor 143 is located on the back of the electronic device 100, opposite a touch screen on the front of the electronic device 100, so that the touch screen is enabled for use as a viewfinder for still and/or video image acquisition. In some implementations, another image sensor 143 is located on the front of the electronic device 100 so that the user's image is obtained (e.g., for selfies, for videoconferencing while the user views the other video conference participants on the touch screen, etc.). In some implementations, the image sensor(s) 143 corresponds to one or more HMD cameras. In some implementations, the image sensor(s) 143 includes one or more depth sensors. In some implementations, the image sensor(s) 143 includes a monochrome or color camera. In some implementations, the image sensor(s) 143 includes an RGB depth (RGB-D) sensor.

The I/O subsystem 106 optionally includes contact intensity sensors that detect intensity of contacts on the electronic device 100 (e.g., a touch input on a touch-sensitive surface of the electronic device 100). The contact intensity sensors may be coupled with an intensity sensor controller in the I/O subsystem 106. The contact intensity sensor(s) optionally include one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). The contact intensity sensor(s) receive contact intensity information (e.g., pressure information or a proxy for pressure information) from the physical environment. In some implementations, at least one contact intensity sensor is collocated with, or proximate to, a touch-sensitive surface of the electronic device 100. In some implementations, at least one contact intensity sensor is located on the back of the electronic device 100.

In some implementations, the depth sensor 150 is configured to obtain depth data, such as depth information characterizing an object within an obtained input image. For example, the depth sensor 150 corresponds to one of a structured light device, a time-of-flight device, and/or the like.

The eye tracking sensor(s) 164 detect eye gaze of a user of the electronic device 100 and generate eye tracking data indicative of the eye gaze of the user. In various implementations, the eye tracking data includes data indicative of a fixation point (e.g., point of regard) of the user on a display panel, such as a display panel within a head-mountable device (HMD), a head-mountable enclosure, or within a heads-up display.

The ambient light sensor (ALS) 190 detects ambient light from the physical environment. In some implementations, the ambient light sensor 190 is a color light sensor. In some implementations, the ambient light sensor 190 is a two-dimensional (2D) or a three-dimensional (3D) light sensor.

In various implementations, the electronic device 100 includes a privacy subsystem 170 that includes one or more privacy setting filters associated with user information, such as user information included in the eye gaze data and/or body position data associated with a user. In some implementations, the privacy subsystem 170 selectively prevents and/or limits the electronic device 100 or portions thereof from obtaining and/or transmitting the user information. To this end, the privacy subsystem 170 receives user preferences and/or selections from the user in response to prompting the user for the same. In some implementations, the privacy subsystem 170 prevents the electronic device 100 from obtaining and/or transmitting the user information unless and until the privacy subsystem 170 obtains informed consent from the user. In some implementations, the privacy subsystem 170 anonymizes (e.g., scrambles or obscures) certain types of user information. For example, the privacy subsystem 170 receives user inputs designating which types of user information the privacy subsystem 170 anonymizes. As another example, the privacy subsystem 170 anonymizes certain types of user information likely to include sensitive and/or identifying information, independent of user designation (e.g., automatically).

Figure 2C:
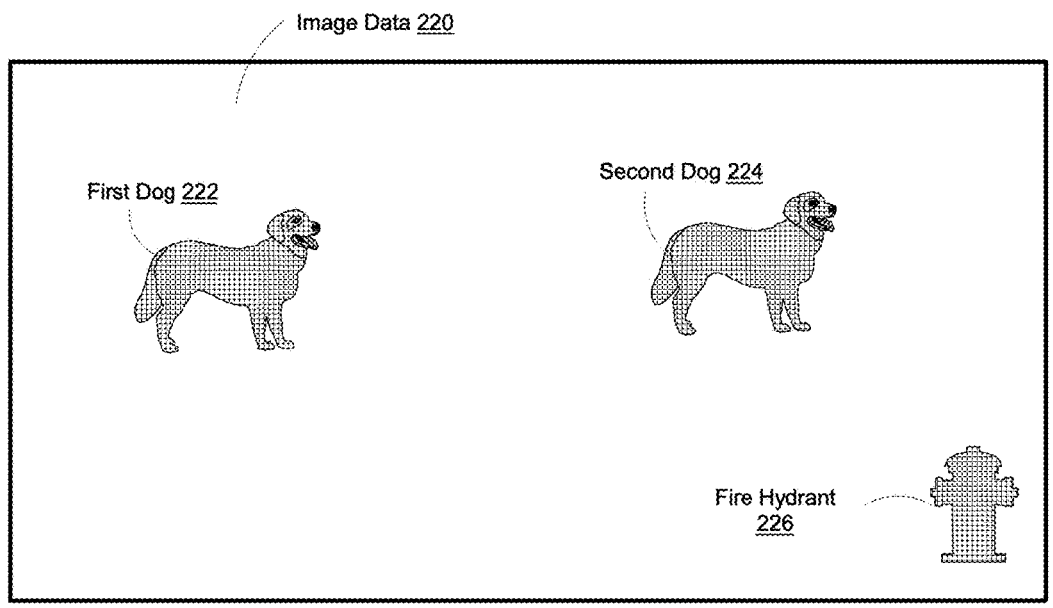
Figure 2C:
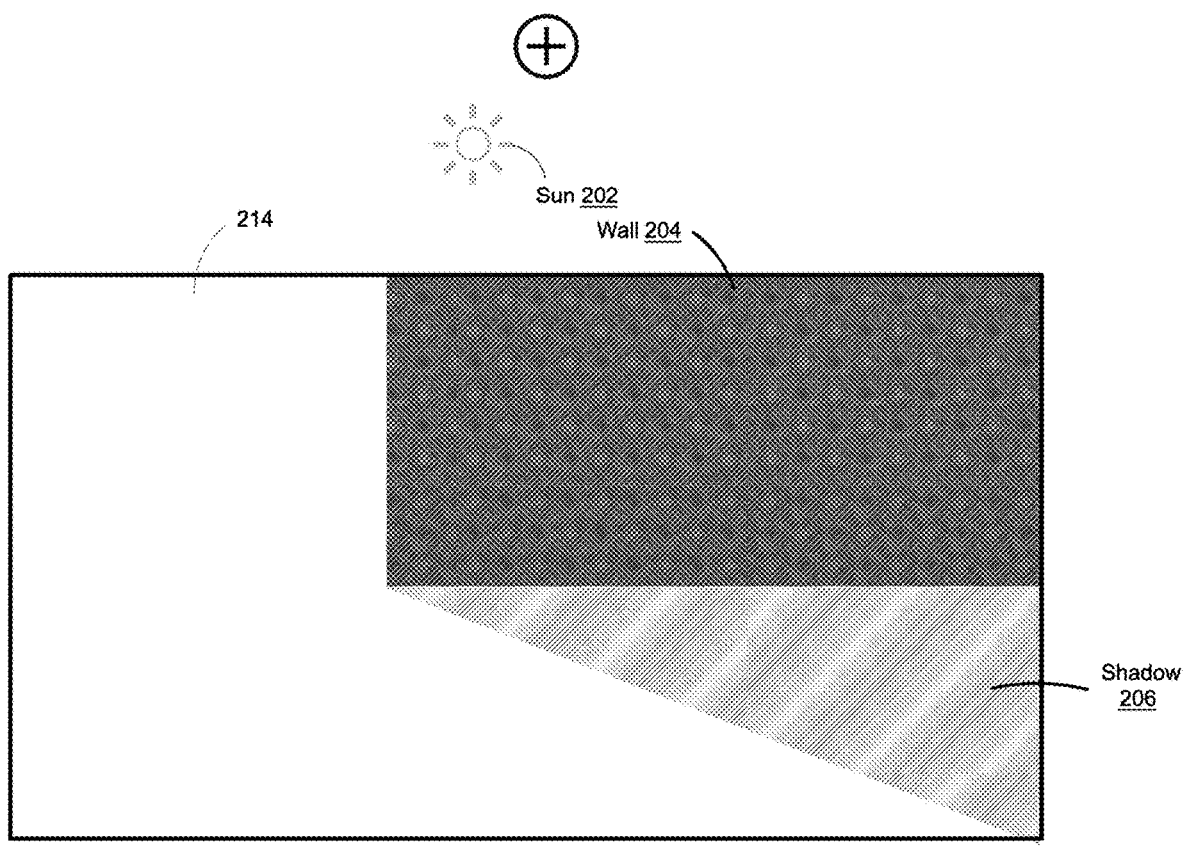

FIGS. 2A-2D are an example of light from a physical environment 200 interfering with display of image data. As illustrated in FIG. 2A, the physical environment 200 includes a sun 202, a physical wall 204, and a physical shadow 206. The physical shadow 206 is cast by the physical wall 204 based on the position of the sun 202 relative to the physical wall 204. The physical wall 204 and the physical shadow 206 include different patterns (e.g., different hatch patterns) in order to indicate that they have different luminance value and/or different chromaticity values (e.g., hue, chroma, saturation, etc.). For example, the physical wall 204 is red, whereas the physical shadow 206 is gray.

The physical environment 200 also includes a user 210 holding an electronic device 212 (e.g., a mobile device) that includes a display 214. The display 214 is associated with a field-of-view 216. The field-of-view 216 includes the Sun 202, the physical wall 204, and the physical shadow 206. As illustrated in FIG. 2B, the display 214 displays the aforementioned features of the physical environment 200.

As illustrated in FIG. 2C, the electronic device 212 adds image data 220 to the display 214, as indicated by the plus sign, which is illustrated for purely explanatory purposes. The image data 220 represents a first dog 222, a second dog 224, and a fire hydrant 226. The first dog 222, the second dog 224, and the fire hydrant 226 have a common pattern. The common pattern is used in order to illustrate how ambient light from the sun 202 adversely affects display, by the display 214, of the image data, as will be described below.

Figure 2D:
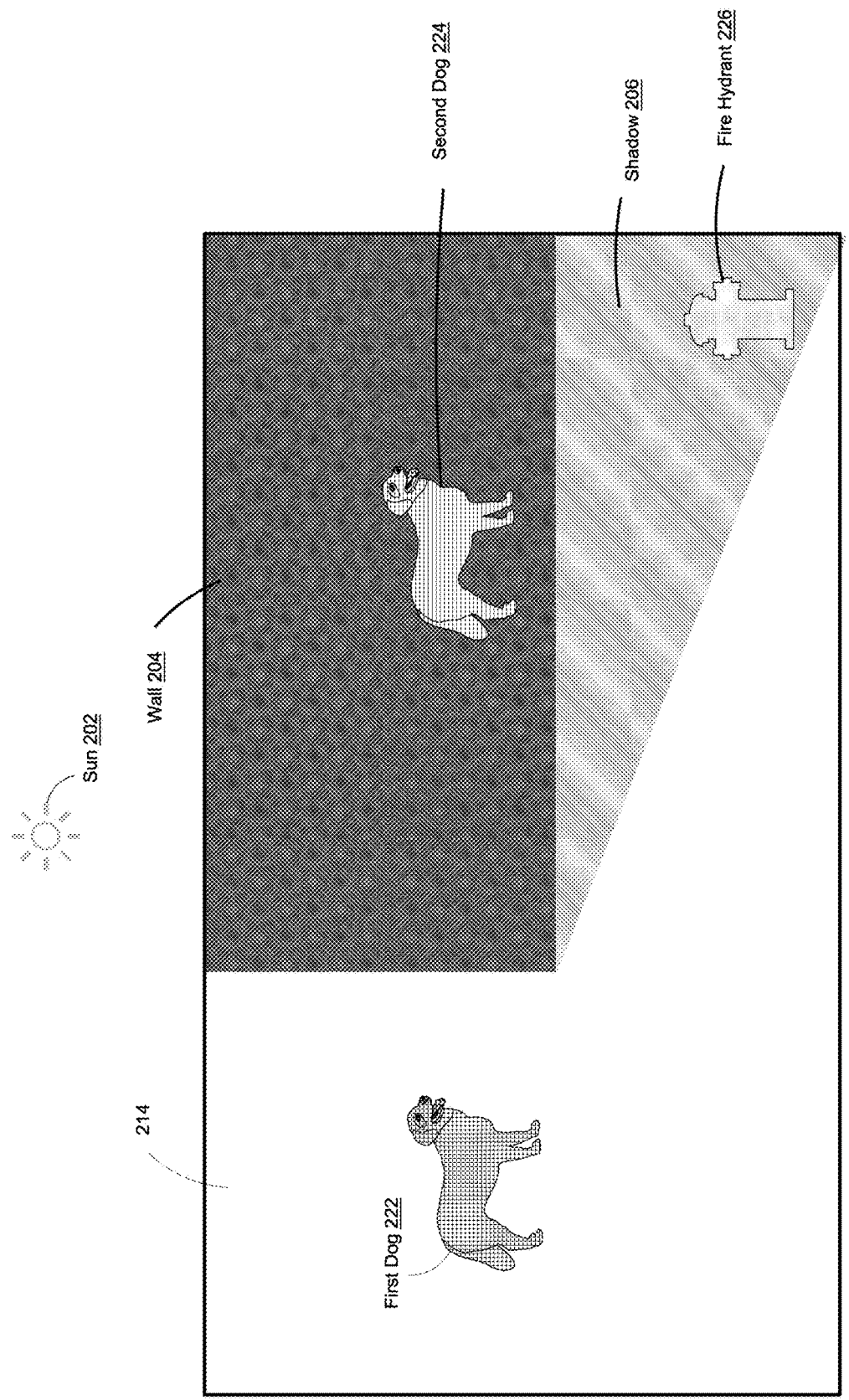

As illustrated in FIG. 2D, the electronic device 212 displays the image data 220 on the display 214, such as by overlaying the image data 220 onto features of the physical environment 200 (e.g., the physical wall 204 and the physical shadow 206). The first dog 222 has the common pattern described with reference to FIG. 2B, because neither the physical wall 204 nor the physical shadow 206 interfere display of the first dog 222. Namely, the first dog 222 is positioned at a portion of the display 214 that is not physically obscured by the physical wall 204 or the physical shadow 206. Because the first dog 222 is not obscured, there is no contribution from background ambient light, and thus in effect the background ambient light is black or near black with respect to the first dog 222. Accordingly, the first dog 222, when displayed, does not experience perceptual contrast loss/distortion or chromaticity shifts.

However, ambient light from the physical environment 200 adversely affects display of the second dog 224 and the fire hydrant 226. Namely, the second dog 224 includes a first pattern that is different from the common pattern because the second dog 224 is positioned behind the physical wall 204. The fire hydrant 226 includes a second pattern that is different from the first pattern and the common pattern because the fire hydrant 226 is positioned within the physical shadow 206. For example, instead of the second dog 224 appearing with a white color (e.g., a Maltese-breed dog), the second dog 224 incorrectly appears with a greenish tint because the physical wall 204 is green colored. As another example, rather than appearing with a fire red color, the fire hydrant 226 incorrectly appears as a darker red color due to the physical shadow 206, resulting in less contrast between the fire hydrant 226 and the physical shadow 206.

FIGS. 3A-3G are an example of semantically mapping image data based on luminance values associated with ambient light from a physical environment in accordance with some implementations. In various implementations, the features described with reference to FIGS. 3A-3G are performed by an electronic device, such as the electronic device 100 illustrated in FIG. 1. In various implementations, the features described with reference to FIGS. 3A-3G are performed by a head-mountable device (HMD) that includes an integrated display (e.g., a built-in display).

The electronic device includes a display 314, such as a see-through display. In some implementations, the see-through display 314 corresponds to a translucent display. In some implementations, the see-through display 314 corresponds to glasses with optical see-through. In some implementations, the see-through display 314 is made of a see-through material (e.g., glass or plastic). For example, in contrast to pure compositing using a video stream, the additive display is capable of reflecting projected images off of the display while enabling the user to see through the display. In some implementations, the see-through display 314 displays at least a nominal amount of light from the physical environment. In some implementations, the see-through display 314 includes a photochromic lens or an electrochromic layer.

Figure 3A:
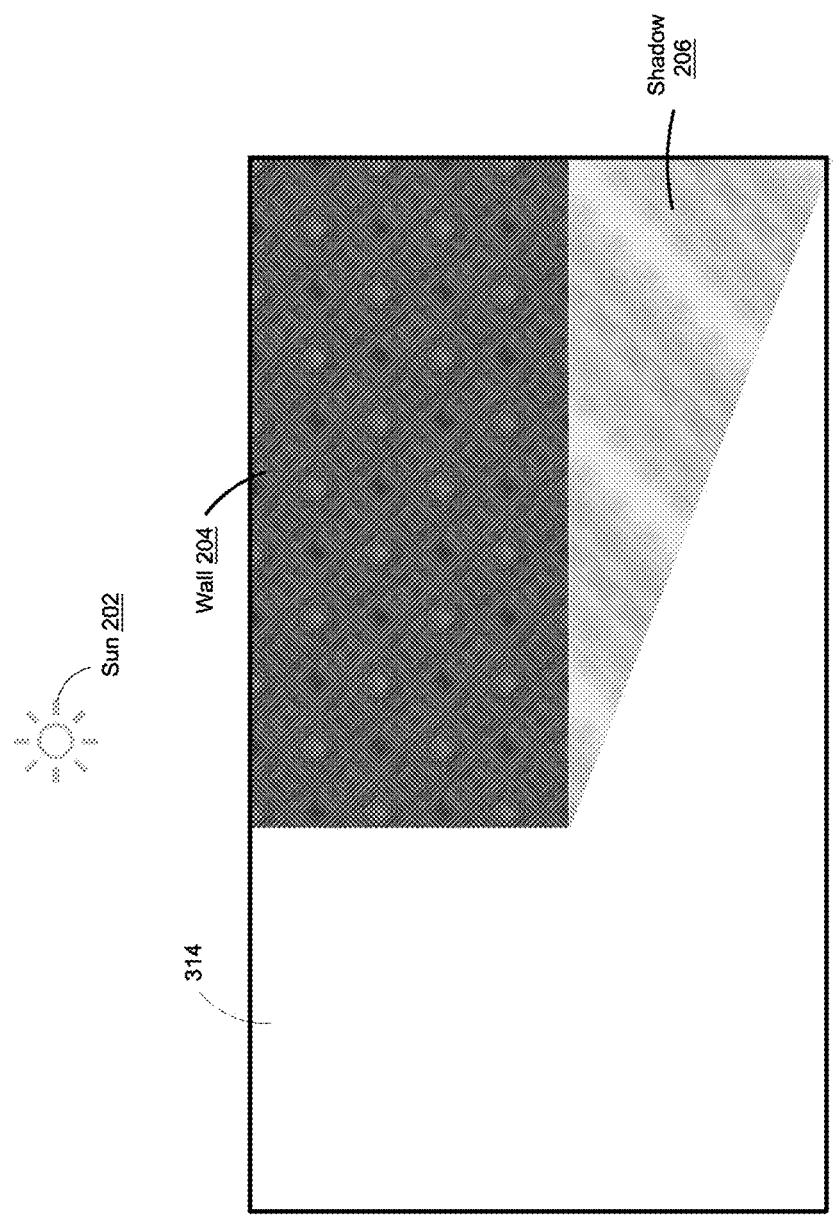
FIGS. 3A-3G are an example of semantically mapping image data based on luminance values associated with ambient light from a physical environment in accordance with some implementations.

As illustrated in FIG. 3A, the electronic device displays, on the see-through display 314, the physical wall 204 and the physical shadow 206 within the physical environment 200, as described with reference to FIGS. 2A and 2B.

Figure 3B:
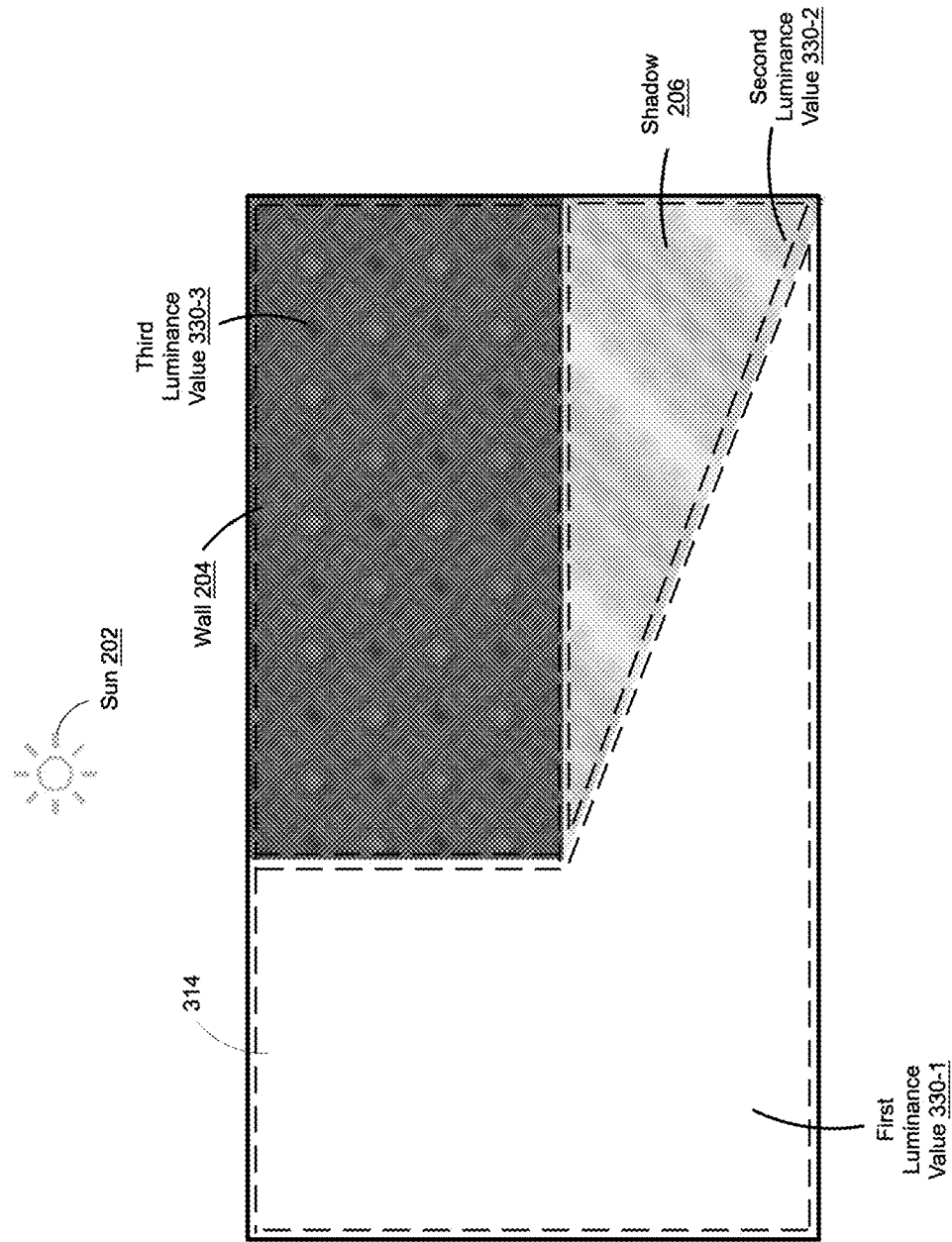

The electronic device senses a plurality of luminance values associated with ambient light from the physical environment 200. The plurality of luminance values quantifies the ambient light arriving at the see-through display 314. For example, in some implementations, the electronic device includes one or both of an ambient light sensor (e.g., the ambient light sensor 190 in FIG. 1) and image sensor(s) (e.g., the image sensor(s) 143 in FIG. 1) in order to sense the plurality of luminance values. For example, as illustrated in FIG. 3B, the plurality of luminance values includes a first luminance value 330-1 that characterizes ambient light arriving at the left portion of the see-through display 314. The plurality of luminance values includes a second luminance value 330-2 that characterizes ambient light arriving at a portion of the see-through display 314 corresponding to the physical shadow 206. The plurality of luminance values includes a third luminance value 330-3 that characterizes ambient light arriving at a portion of the see-through display 314 corresponding to the physical wall 204. Because the first luminance value 330-1 is associated with a portion of the physical environment 200 that is unobstructed by the physical wall 204 and the physical shadow 206, more light from the sun 202 reaches the portion of the physical environment 200. Accordingly, the first luminance value 330-1 is greater than the second luminance value 330-2 and the third luminance value 330-3. Moreover, because the second luminance value 330-2 is associated with a portion of the physical environment 200 including the physical shadow 206, which is cast by the physical wall 204, the second luminance value 330-2 is greater than the third luminance value 330-3.

Figure 3C:
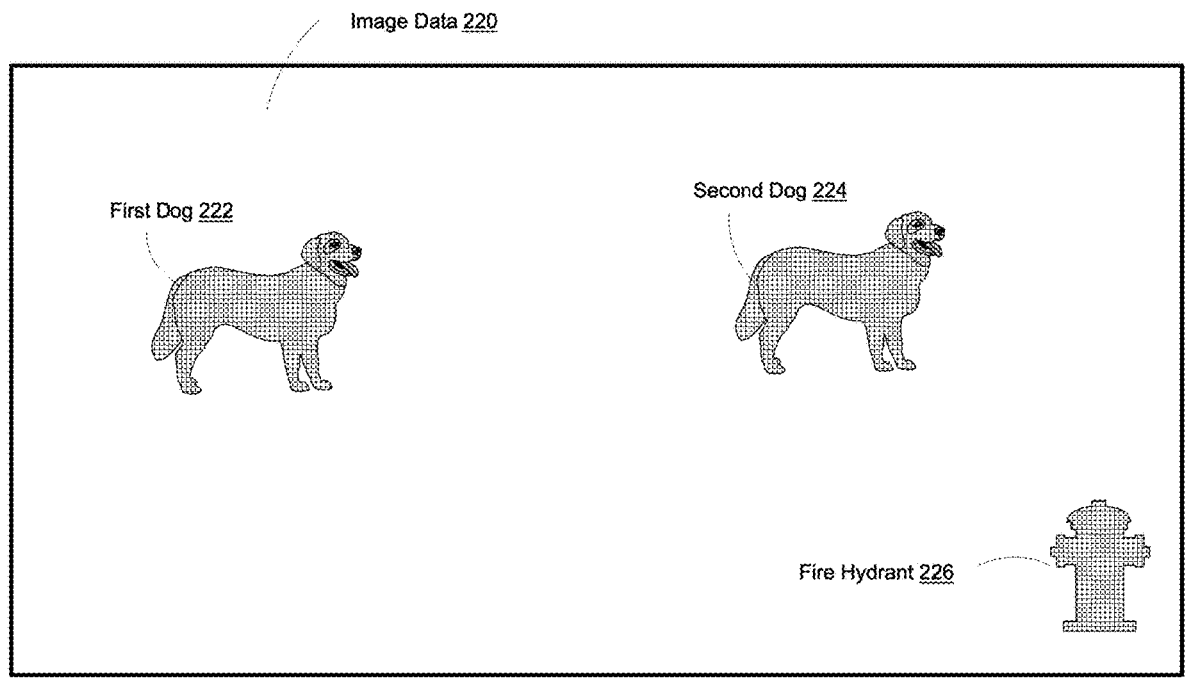
Figure 3D:
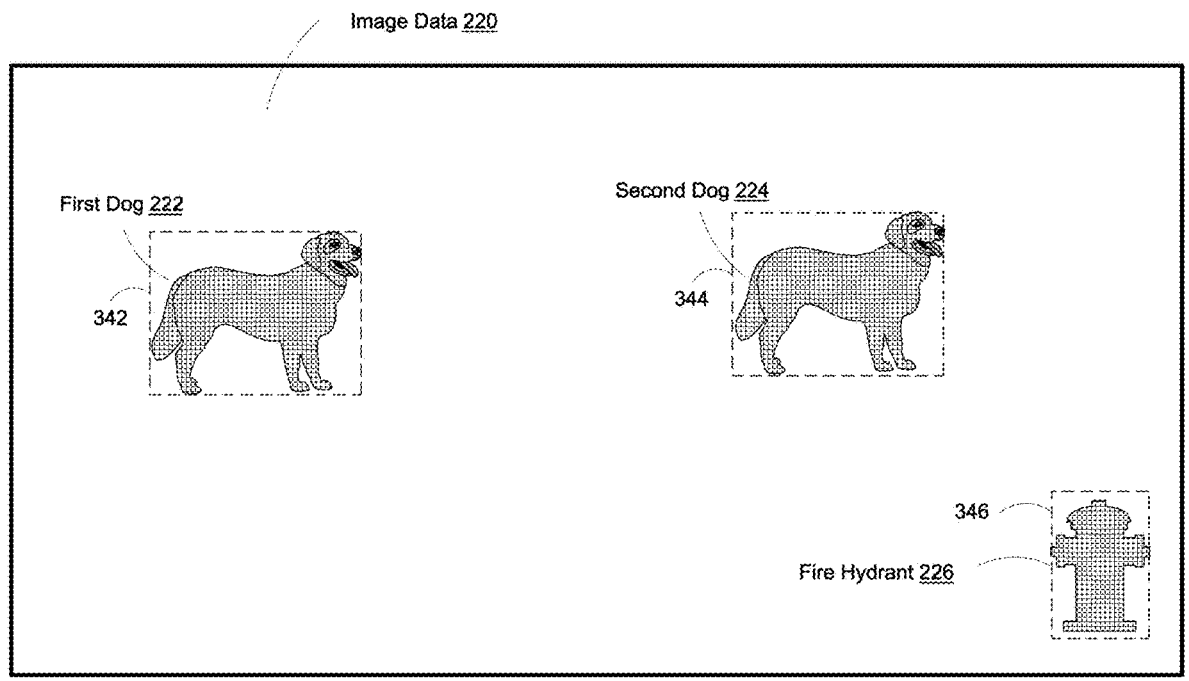

FIG. 3C illustrates the image data 220 to be displayed on the see-through display 314, which is described with reference to FIG. 2C. Notably, the first dog 222, the second dog 224, and the fire hydrant 226 share a common pattern (e.g., common hatch pattern), as discussed above. Further discussion of the image data 220 is omitted for the sake of brevity.

The electronic device obtains a plurality of semantic values respectively associated with a plurality of portions within image data. The plurality of portions includes a first portion of the image data and a second portion of the image data. For example, with reference to FIG. 3D, the electronic device obtains a first semantic value (e.g., "Leftmost Dog" or "Golden retriever dog") associated with the first dog 222, a second semantic value (e.g., "Rightmost Dog" or "Maltese Dog") associated with the second dog 224, and a third semantic value (e.g., "Fire hydrant" or "Red fire hydrant") associated with the fire hydrant 226. In some implementations, the electronic device determines or generates the plurality of semantic values by utilizing semantic segmentation, sometimes with the aid of an integrated neural network. For example, with reference to FIG. 3D, the first semantic value is associated with a first bounding box 342, the second semantic value is associated with a second bounding box 344, and the third semantic value is associated with a third bounding box 346.

The electronic device identifies a first one of the plurality of semantic values that satisfies a criterion. The first one of the plurality of semantic values is associated with the first portion of the image data. For example, the first one of the plurality of semantic values corresponds to an object of interest, such as a face of a person or text. As will be described with reference to FIG. 3E-3G, the electronic device identifies and utilizes all three obtained semantic values, in order to better illustrate the benefits of semantic-based image mapping based on luminance values. However, one of ordinary skill in the art will appreciate that some implementations include identifying a subset of the plurality of semantic values, which may result in the electronic device utilizing fewer processing resources.

Figure 3E:
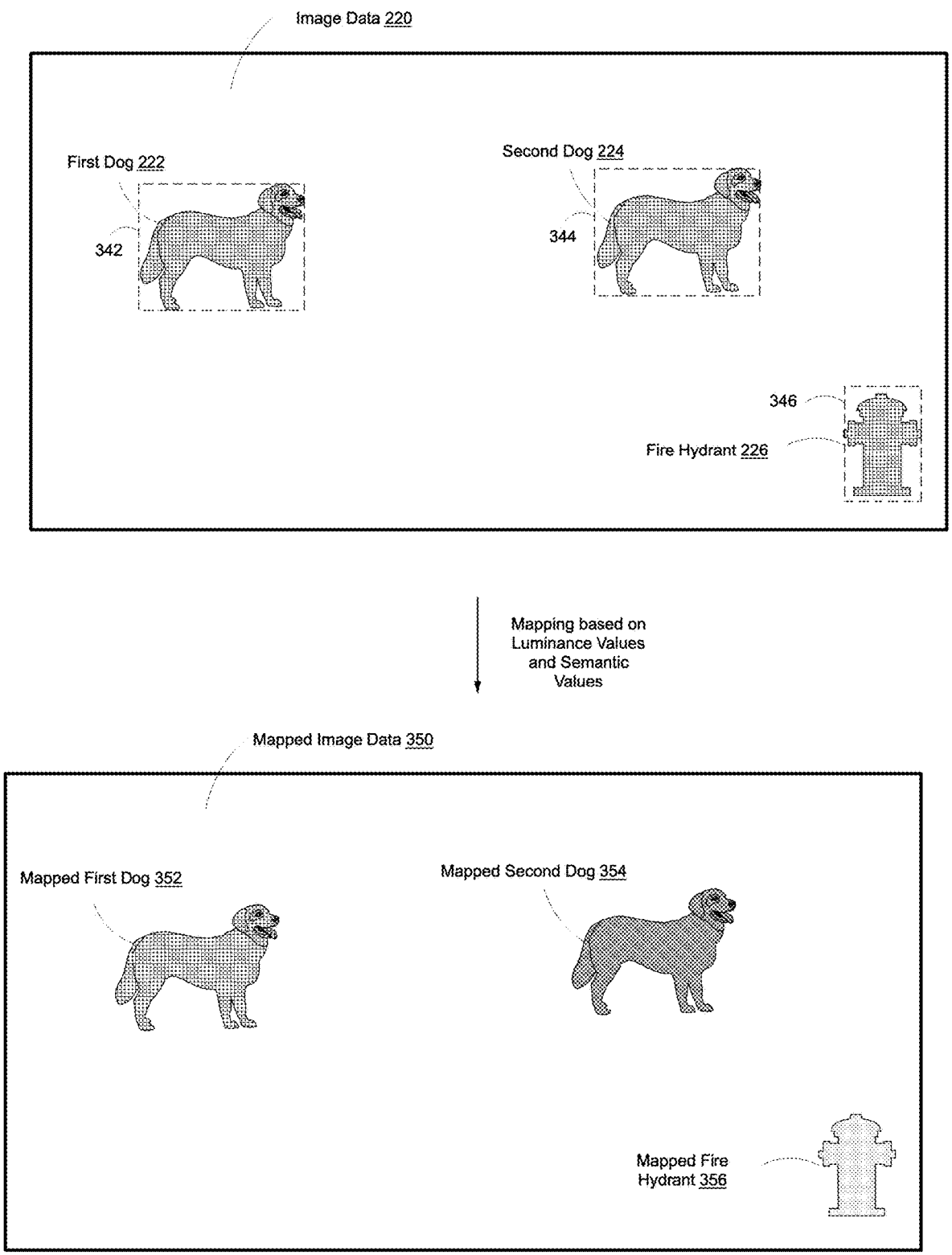

The electronic device maps, based on a function of a portion of the plurality of luminance values, the image data to predetermined display characteristics of the first portion of the image data within a performance threshold. In some implementations, the performance threshold is a function of distortion level (e.g., minimal distortion in color or contrast of the first portion), quality of color reproduction, user experience, and/or the like. For example, with reference to FIG. 3E, the electronic device generates, from the image data 220, mapped image data 350 based on the plurality of luminance values (330-1-330-3) and the three aforementioned semantic values. Namely, the first dog 222 is to be displayed at a position on the see-through display 314 that is not proximate to the physical wall 204 or the physical shadow 206. Accordingly, display of the first dog 222 will be substantially unobstructed by ambient light reflected off of these physical objects. Accordingly, in effect the background ambient light is black or near black with respect to the first dog 222. Thus, the electronic device generates a mapped first dog 352 that is the same as or substantially similar to the first dog 222, as is illustrated in FIG. 3E by the two respective representations of the first dog having a substantially similar pattern.

However, the second dog 222 is to be displayed at a position on the see-through display 314 that is behind the physical wall 204. Accordingly, the physical wall 204 blocks ambient light from the sun 202 reaching the second dog 222 and/or reflects the ambient light onto the second dog 222. The physical wall 204 blocking and reflecting the ambient light is characterized by the third luminance value 330-3, and the electronic device generates a mapped the second dog 354 that is based on the third luminance value 330-3. For example, as compared with the second dog 224, the mapped second dog 354 has a higher luminance value in order to offset the blocked ambient light. As another example, as compared with the second dog 224, the mapped second dog 354 has a different color profile (e.g., different hue or saturation) in order to offset the color of the physical wall 204 that mixes with (e.g., due to reflection) the mapped second dog 354. The differences in respective display characteristics between the second dog 224 and the mapped the second dog 354 are illustrated in FIG. 3E by the two respective representations of the second dog having different patterns.

Moreover, the fire hydrant 226 is to be displayed at a position on the see-through display 314 that is within the physical shadow 206. Accordingly, the amount of ambient light from the sun 202 reaching the fire hydrant 226 is less than the amount reaching the first dog 222. The lower amount of the ambient light reaching the fire hydrant 226 is characterized by the second luminance value 330-2. Accordingly, the electronic device generates a mapped fire hydrant 356 that is based on the second luminance value 330-2. For example, as compared with the fire hydrant 226, the mapped fire hydrant 356 has a higher luminance value in order to offset the blocked ambient light. The differences in respective display characteristics between the fire hydrant 226 and the mapped fire hydrant 356 are illustrated in FIG. 3E by the two respective representations of the fire hydrant having different patterns.

Figure 3F:
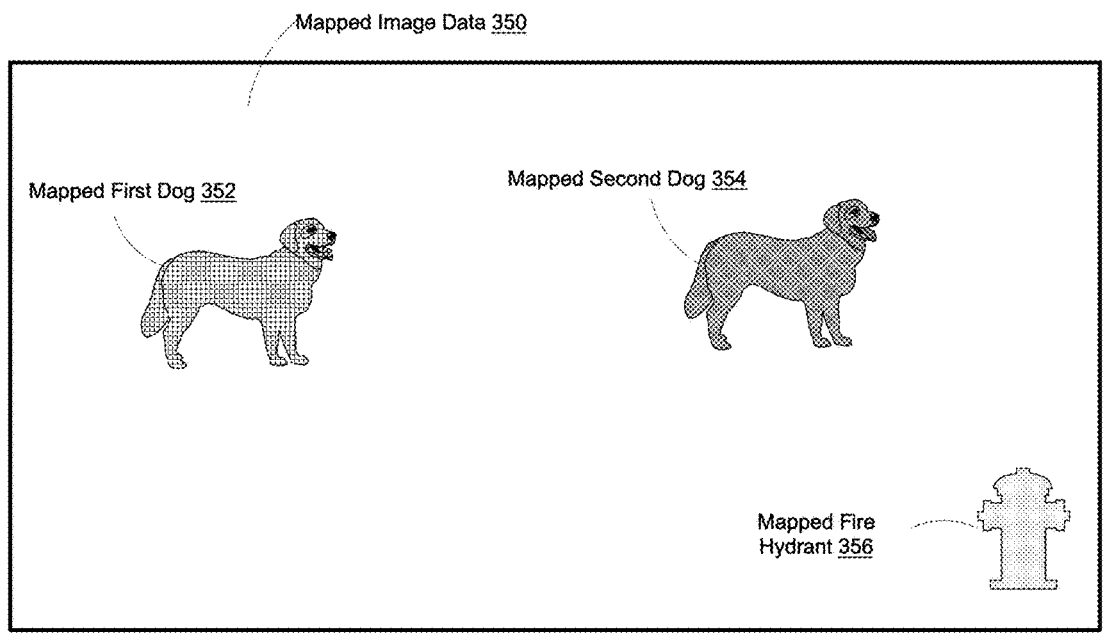
Figure 3F:
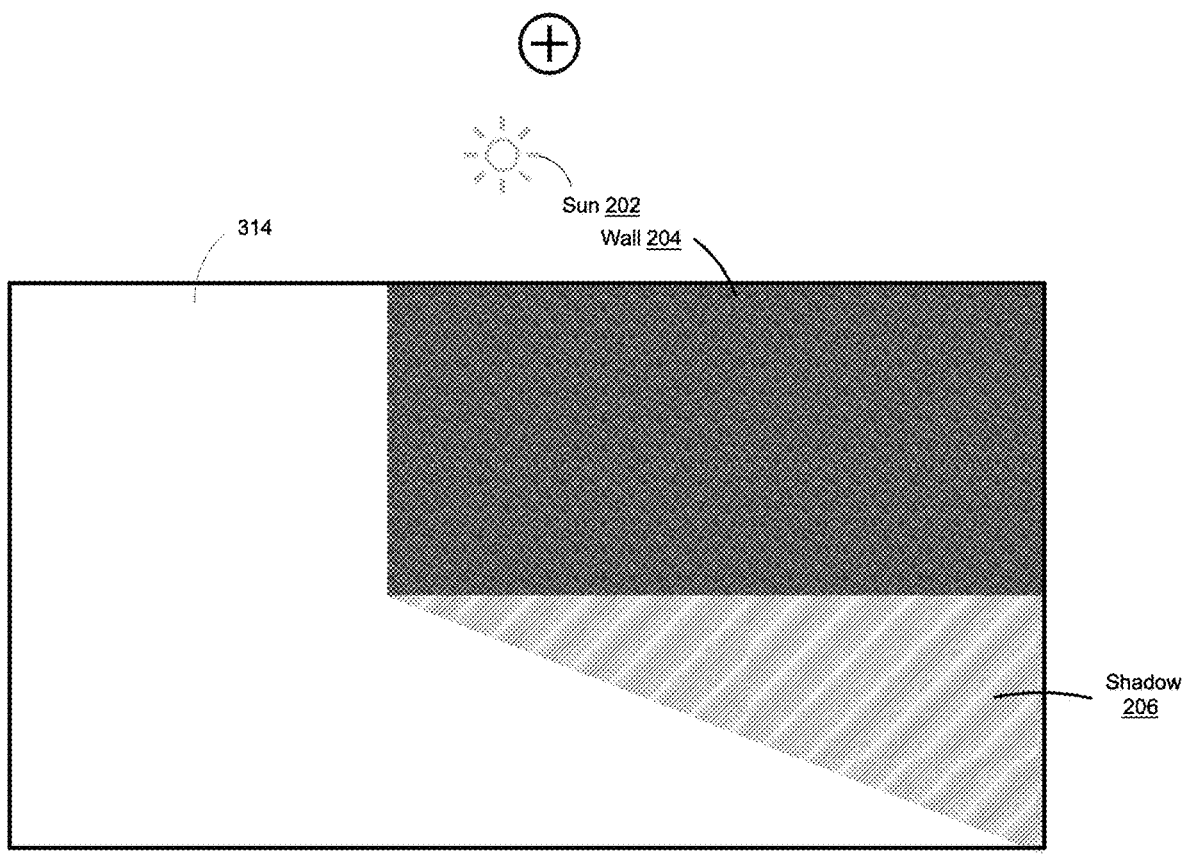

As illustrated in FIG. 3F, the electronic device adds the mapped image data 350 to the see-through display 314, as indicated by the plus sign, which is illustrated for purely explanatory purposes.

Figure 3G:
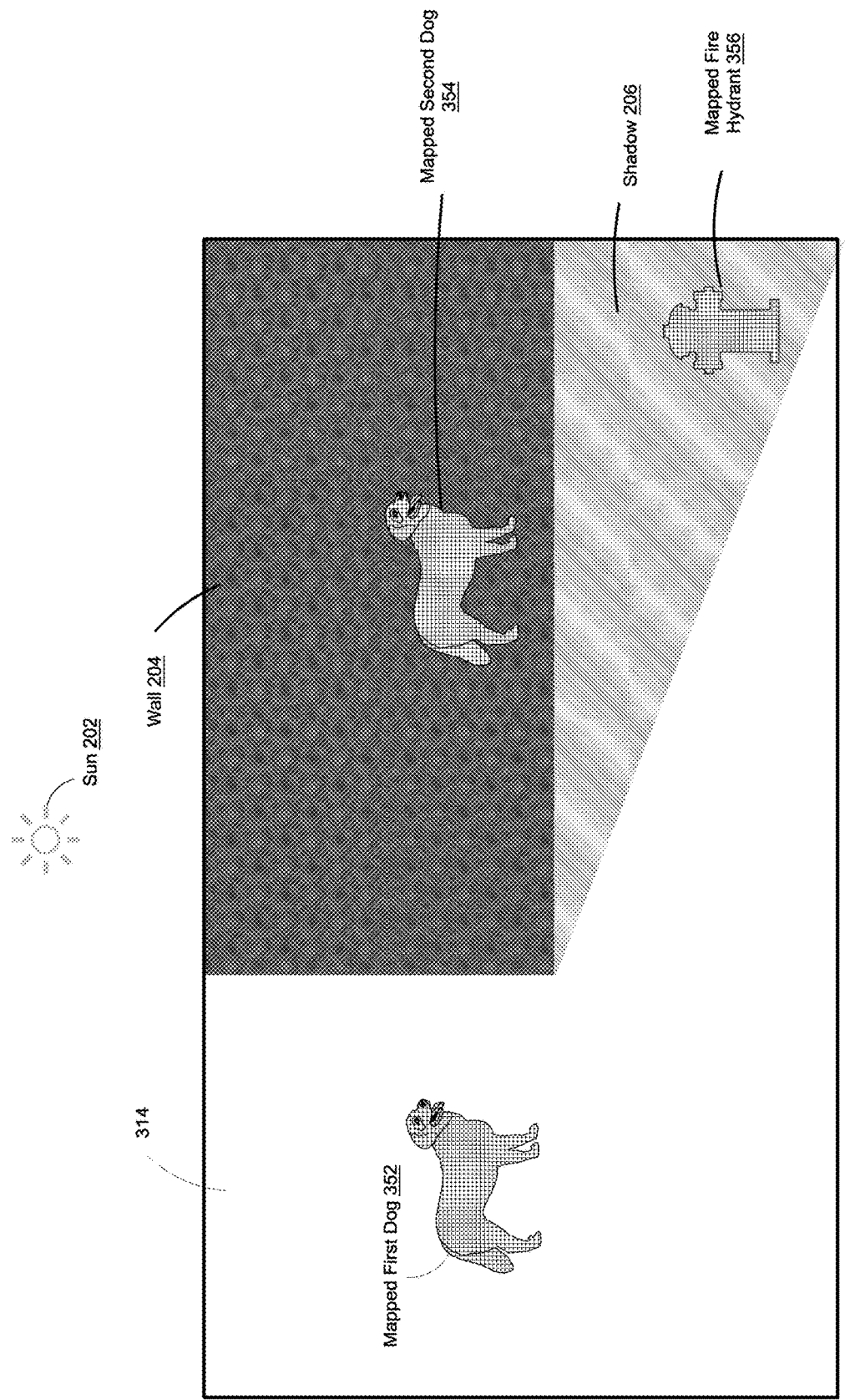

As illustrated in FIG. 3G, the see-through display 314 displays the mapped image data 350, along with the physical wall 204 and the physical shadow 206. Notably, because of the mapping based on the plurality of luminance values, the various representations of mapped objects (352, 354, and 356) share the common pattern, as described with reference to the image data 220 in FIG. 3C. In some implementations, each of the representations of mapped objects (352, 354, and 356) has an appearance that matches a corresponding object within the image data 220 within a performance threshold. In other words, despite the ambient light from the physical environment 200 entering the see-through display 314, the image data 220 has been mapped in order to account for the ambient light. Thus, the resulting displayed mapped image data 350 appears as though there is zero or a nominal amount of ambient light from the physical environment 200. The appearance of the displayed mapped image data 350 is in contrast to an appearance of the displayed image data illustrated in FIG. 2D, in which some or all of the objects have been distorted, color-shifted, contrast-reduced, or otherwise adversely interfered with by the ambient light from the physical environment 200. Accordingly, the electronic device described with reference to FIGS. 3A-3G provides a better user-experience because the content that is added to the see-through display 314 more faithfully represents the corresponding image data 220.

Figure 4:
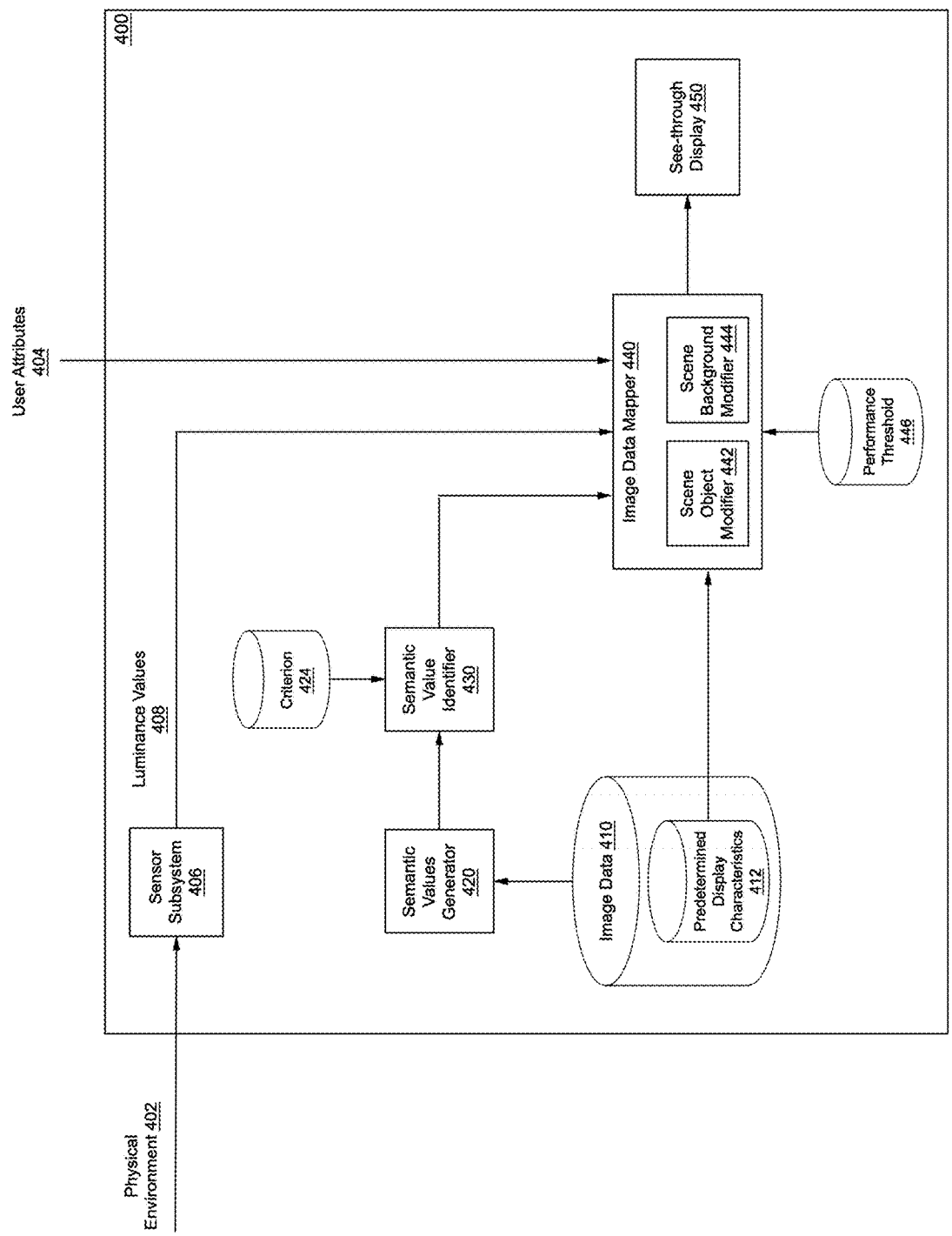
FIG. 4 is an example of a block diagram of a system for semantically mapping image data based on luminance values associated with ambient light from a physical environment in accordance with some implementations.

FIG. 4 is an example of a block diagram of a system 400 for semantically mapping image data based on luminance values associated with ambient light from a physical environment in accordance with some implementations. According to various implementations, the system 400, or components thereof, is similar to and adapted from corresponding components of the electronic device 100 illustrated in FIG. 1. According to various implementations, the system 400 is similar to and adapted from the electronic device described with reference to FIGS. 3A-3G. In various implementations, the system 400 or components thereof are integrated within a head-mountable device (HMD) including a see-through display.

In some implementations, the system 400 includes a sensor subsystem 406 that senses a plurality of luminance values 408. The plurality of luminance values 408 quantifies ambient light from a physical environment 402 arriving at a see-through display 450. The see-through display 450 is integrated within the system 400. For example, with reference to FIG. 3B, the sensor subsystem 406 senses different luminance values 330-1-330-3 associated with different portions of the physical environment 200. In some implementations, the sensor subsystem 406 includes a combination of sensors, such as an ambient light sensor (ALS) (e.g., a two-dimensional (2D) sensor), an image sensor, a depth sensor (e.g., a time of flight sensor), and/or an inertial measurement unit (IMU). For example, in some implementations, the sensor subsystem 406 includes a monochrome or color camera with a depth sensor (RGB-D) and determines camera pose to point-of-view projection based on data from the RGB-D. As another example, in some implementations, the sensor subsystem 406 captures a lower resolution scene image, such as via a dedicated low-resolution image sensor or a dedicated high-resolution image sensor. In some implementations, the sensor subsystem 406 is implemented as a hardened IP block. In some implementations, the sensor subsystem 406 is implemented by using software and hardware accelerators.

The system 400 includes a semantic values generator 420 that generates a plurality of semantic values respectively associated with a plurality of portions within image data. The plurality of portions includes a first portion of the image data and a second portion of the image data. In some implementations, the image data is stored within an image data datastore 410 integrated within the system 400. For example, with reference to FIG. 3D, the system 400 semantically identifies the first dog 222, the second dog 224, and the fire hydrant 226.

The system 400 includes a semantic value identifier 430 that identifies a first one of the plurality of semantic values that satisfies a criterion. In some implementations, the criterion is stored within a criterion datastore 424 integrated within the system 400. The first one of the plurality of semantic values is associated with the first portion of the image data. For example, the first portion of the image data includes a foreground object, such as a face of a person or a dog.

The system 400 includes an image data mapper 440 that maps, based on a function of a portion of the plurality of luminance values 408, the image data to predetermined display characteristics of the first portion of the image data within a performance threshold. In some implementations, the predetermined display characteristics is stored within a predetermined display characteristics datastore 412 integrated within the system 400. In some implementations, the performance threshold is stored within a performance threshold datastore 446 integrated within the system 400. For example, in some implementations, the image data mapper 440 maps the image data in order to prevent exceeding a threshold amount of distortion.

In some implementations, the image data mapper 440 includes one or more of a scene object modifier 442 and a scene background modifier 444. The scene object modifier 442 emphasizes characteristics of an object within the image data, such as increasing the luminance value associated with the object or changing the chromaticity associated with the object, in order to account for the plurality of luminance values 408. The scene background modifier 444 de-emphasizes characteristics of a background represented by the image data, such as decreasing the luminance value of background portions of the background.

In some implementations, the image data mapper 440 maps the image data based on a further function of user attributes 404. For example, the user attributes 404 indicate an eye gaze of a user (e.g., from the eye tracking sensor(s) 164 in FIG. 1), and the image data mapper 440 maps portions of the image data that are within the eye gaze at a higher resolution than other portions of the image data. As another example, the user attributes 404 indicate a head and body pose position of a user, and the system 400 maps the image data based on the head and body pose position.

Figure 5:
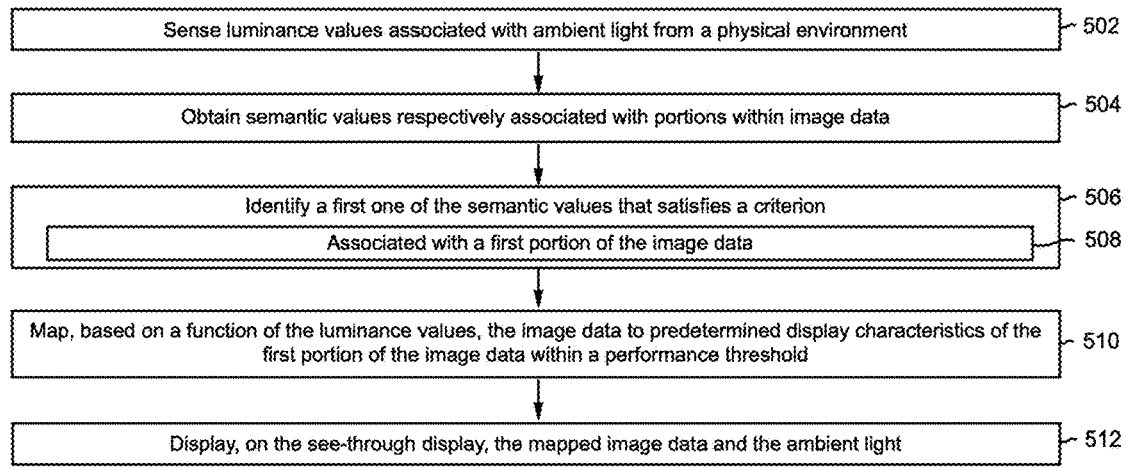
FIG. 5 is an example of a flow diagram of a method of semantically mapping image data based on luminance values associated with ambient light from a physical environment in accordance with some implementations.

FIG. 5 is an example of a flow diagram of a method 500 of semantically mapping image data based on luminance values associated with ambient light from a physical environment in accordance with some implementations. In various implementations, the method 500 or portions thereof are performed by an electronic device (e.g., the electronic device 100 in FIG. 1 or the electronic device described with reference to FIGS. 3A-3G. In various implementations, the method 500 or portions thereof are performed by the system 400. In various implementations, the method 500 or portions thereof are performed by a head-mountable device (HMD) including a see-through display. In some implementations, the method 500 is performed by processing logic, including hardware, firmware, software, or a combination thereof. In some implementations, the method 500 is performed by a processor executing code stored in a non-transitory computer-readable medium (e.g., a memory).

As represented by block 502, the method 500 includes sensing a plurality of luminance values associated with ambient light from a physical environment. The plurality of luminance values quantifies the ambient light arriving at the see-through display. For example, the plurality of luminance values is indicative of the brightness or intensity of the ambient light, such that each of the plurality of luminance values provides a luminance range of a corresponding portion of ambient light entering the see-through display. For example, with reference to FIG. 3B, the method 500 includes sensing different luminance values 330-1-330-3 associated with different portions of the physical environment 200.

As represented by block 504, the method 500 includes obtaining a plurality of semantic values respectively associated with a plurality of portions within image data. The plurality of portions includes a first portion of the image data and a second portion of the image data. For example, in some implementations, obtaining the plurality of semantic values includes determining the plurality of semantic values via semantic segmentation. As one example, with reference to FIG. 3D, the electronic device obtains a first semantic value (e.g., "Leftmost Dog" or "Golden retriever dog") associated with the first dog 222, a second semantic value (e.g., "Rightmost Dog" or "Maltese Dog") associated with the second dog 224, and a third semantic value (e.g., "Fire hydrant" or "Red fire hydrant") associated with the fire hydrant 226.

As represented by block 506, the method 500 includes identifying a first one of the plurality of semantic values that satisfies a criterion. As represented by block 508, the first one of the plurality of semantic values is associated with the first portion of the image data. For example, in some implementations, the criterion is satisfied when the first semantic value provides an object of interest, such as a "face" of a person. As another example, in some implementations, the criterion is not satisfied for background objects. As yet another example, in some implementations, the criterion is when the first semantic value corresponds to a particular object type, such as a living object (e.g., a person, animal, plant). As one example, with reference to FIG. 3D, the electronic device identifies that the semantic value of "dog," which is associated with the first dog 222, satisfies the criterion because a "dog" corresponds to a living entity.

As represented by block 510, the method 500 includes mapping, based on a function of a portion of the plurality of luminance values, the image data to predetermined display characteristics of the first portion of the image data within a performance threshold. In some implementations, the performance threshold is a function of distortion level (e.g., minimal distortion in color or contrast of the first portion), quality of color reproduction, user experience, and/or the like. In some implementations, the first portion of the image data is associated with a first region of the see-through display, and the portion of the plurality of luminance values quantifies a corresponding portion of the ambient light arriving at the first region of the see-through display. For example, with reference to FIGS. 3B and 3E-3G, the first luminance value 330-1 quantifies a portion of the ambient light arriving at a first region on the see-through display 312, and the see-through display 312 displays the mapped first dog 352 within the first region.

In some implementations, the predetermined display characteristics include a first luminance characteristic associated with the first portion of the image data.

In some implementations, the predetermined display characteristics include a first chromaticity characteristic associated with the first portion of the image data. For example, the first chromaticity characteristic includes a combination of a hue characteristic, a chroma characteristic, and a saturation characteristic of the first portion of the image data. For example, if the ambient light is predominately one color (e.g., green trees), and the predetermined display characteristic of the first portion of the image data is a different color, the method 500 includes mapping the first portion of the image data in order to increase the chroma characteristic (e.g., color intensity or color purity) of the first portion of the image data. In some implementations, the method 500 includes rotating the hue of the first portion of the image data so that the color appears more vivid.

In some implementations, the method 500 includes determining predetermined display characteristics of the second portion of the image. For example, in some implementations, the predetermined display characteristics of the second portion of the image include a combination of a second luminance characteristic and a second chromaticity characteristic.

In some implementations, the method 500 includes determining one or more display criteria associated with the see-through display. In some implementations, the one or more display criteria is defined by a gamut of the see-through display. For example, in some implementations, the one or more display criteria includes a luminance criterion that is associated with a luminance range of the see-through display. The luminance range may provide a range of luminance values that is displayable by the see-through display. As another example, in some implementations, the one or more display criteria includes a color range criterion. For example, the color range criterion is defined by a range of colors that is displayable by the see-through display.

In some implementations, mapping the image data includes modifying the image data in order to generate modified image data, based on a function of the first luminance characteristic, the second luminance characteristic, and the luminance criterion. The modified image data includes a first modified portion corresponding to the first portion of the image data and a second modified portion corresponding to the second portion of the image data. In some implementations, the first modified portion satisfies a luminance contrast threshold with respect to the second modified portion, and the first and second modified portions together satisfy the luminance criterion.

In some implementations, mapping the image data includes modifying the image data in order to generate modified image data, based on a function of the first chromaticity characteristic, the second chromaticity characteristic, and the color range criterion. The modified image data includes a first modified portion corresponding to the first portion of the image data and a second modified portion corresponding to the second portion of the image data. In some implementations, the first modified portion satisfies a color contrast threshold with respect to the second modified portion, and the first and second modified portions together satisfy the color range criterion.

As represented by block 512, in some implementations, the method 500 includes displaying, on the see-through display, the mapped image data along with the ambient light. For example, the method 500 includes displaying, at a first region of the see-through display that spatially corresponds to the first portion of the image data, the first portion of the image data according to the mapping. As another example, with reference to FIG. 3G, the see-through display 314 displays the mapped image data 350 overlaid or superimposed onto ambient light features associated with the physical environment 200.

Figure 6:
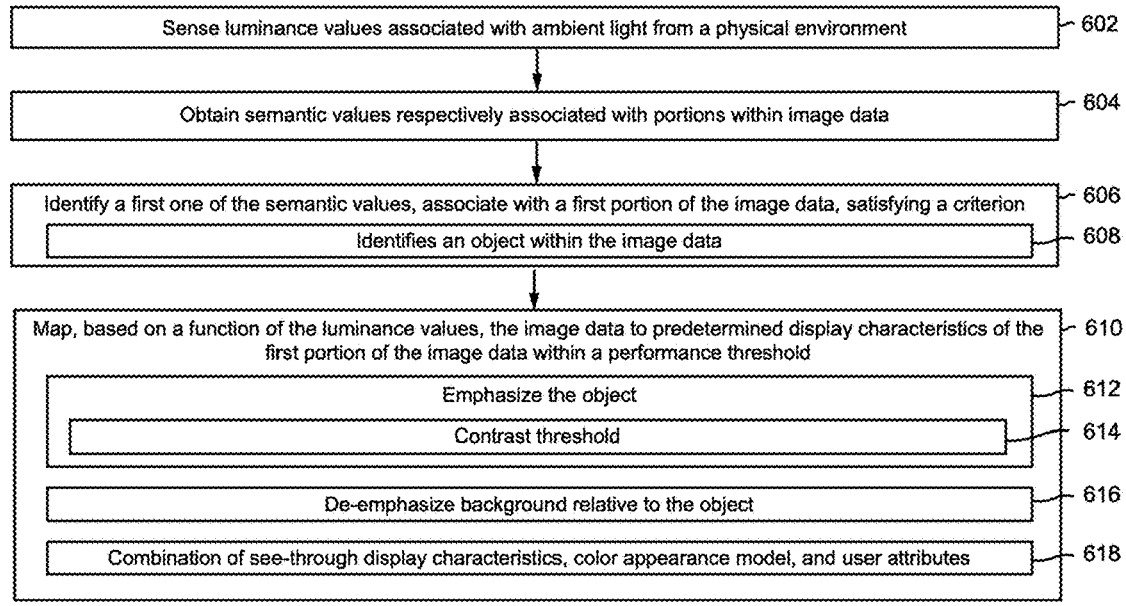
FIG. 6 is another example of a flow diagram of a method of semantically mapping image data based on luminance values associated with ambient light from a physical environment in accordance with some implementations.

FIG. 6 is another example of a flow diagram of a method 600 of modifying rendered image data based on light superposition characteristic values associated with ambient light from a physical environment in accordance with some implementations. In various implementations, the method 600 or portions thereof are performed by an electronic device (e.g., the electronic device 100 in FIG. 1, the electronic device in FIGS. 3A-3C, or the electronic device 412 in FIGS. 4A-4D). In various implementations, the method 600 or portions thereof are performed by the system 400. In various implementations, the method 600 or portions thereof are performed by a head-mountable device (HMD) including a see-through display. In some implementations, the method 600 is performed by processing logic, including hardware, firmware, software, or a combination thereof. In some implementations, the method 600 is performed by a processor executing code stored in a non-transitory computer-readable medium (e.g., a memory).

As represented by block 602, the method 600 includes sensing a plurality of luminance values associated with ambient light from a physical environment. The plurality of luminance values quantifies the ambient light arriving at the see-through display. For example, with reference to FIG. 3B, the method 600 includes sensing different luminance values 330-1-330-3 associated with different portions of the physical environment 200.

As represented by block 604, the method 600 includes obtaining a plurality of semantic values respectively associated with a plurality of portions within image data. The plurality of portions includes a first portion of the image data and a second portion of the image data. As one example, with reference to FIG. 3D, the electronic device obtains a first semantic value (e.g., "Leftmost Dog" or "Golden retriever dog") associated with the first dog 222, a second semantic value (e.g., "Rightmost Dog" or "Maltese Dog") associated with the second dog 224, and a third semantic value (e.g., "Fire hydrant" or "Red Fire Hydrant") associated with the fire hydrant 226.

As represented by block 606, the method 600 includes identifying a first one of the plurality of semantic values that satisfies a criterion. The first one of the plurality of semantic values is associated with the first portion of the image data. As represented by block 608, in some implementations, the first portion of the image data represents an object, such as a face, text, or other object of interest. As one example, with reference to FIG. 3D, the electronic device identifies that the semantic value of "dog," which is associated with the first dog 222, satisfies the criterion because the "dog" corresponds to a living entity.

As represented by block 610, the method 600 includes mapping, based on a function of a portion of the plurality of luminance values, the image data to predetermined display characteristics of the first portion of the image data within a performance threshold. In some implementations, the performance threshold is a function of distortion level (e.g., minimal distortion in color or contrast of the first portion), quality of color reproduction, user experience, and/or the like. For example, with reference to FIG. 3E, the electronic device maps the second dog 224 to the mapped second dog 354 based on a function of the third luminance value 330-3. The third luminance value 330-3 is associated with a portion of the see-through display 314 in which the mapped second dog 354 is to be displayed. Continuing with this example, the mapped second dog 354, when displayed on the see-through display 314, satisfies predetermined display characteristics of the second dog 224 within the performance threshold, such as having a sufficiently similar chromaticity as the second dog 224.

In some implementations, as represented by block 612, mapping the image data includes modifying the first portion of the image data that represents the object. For example, in some implementations, the method 600 includes modifying an object within the image data, without modifying the second portion of the image data. In this way, an electronic device may save processing resourced by foregoing modifying the entirety of the image data. In some implementations, as represented by block 614, modifying the first portion of the image data produces a threshold amount of contrast between the first portion of the image data and the second portion of the image data. For example, if the first portion of the image data includes text, the contrast of the text is enhanced to be more visible than surrounding objects.

As another example, if the physical environment is dim and the predetermined display characteristic is also dim, the method 600 includes modifying the object in order to make the object brighter. For example, with reference to FIG. 3E, the electronic device maps portions of the image data 220 that respectively represent the first dog 222, the second dog 224, and the fire hydrant 226, but the electronic device foregoes mapping other portions of the image data (e.g., the spaces between the dogs).

In some implementations, as represented by block 616, mapping the image data includes modifying the second portion of the image data, wherein the second portion of the image data represents a scene background relative to the object. For example, in some implementations, the method 600 includes modifying the background portion represented within the image data, without modifying foreground objects. In this way, an electronic device may save processing resourced by foregoing modifying the entirety of the image data. For example, with reference to FIG. 3E, the electronic device maps an area of the image data 220 that does not include one or more of the first dog 222, the second dog 224, and the fire hydrant 226.

In some implementations, as represented by block 618, mapping the image data is based on a further function of various other values. In some implementations, the method 600 includes mapping the image data based on a function of one or more display characteristics associated with the see-through display. For example, the one or more display characteristics of the see-through display include lens characteristics, such as lens shape, lens tint (e.g., frosting), distance between lens and user's eyes, etc. As another example, the one or more display characteristics includes a luminance range associated with the see-through display, such as a display gamut that indicates the range of colors displayable by the see-through display. In some implementations, the method 600 includes mapping the image data based on a function of a color appearance model. For example, a color appearance model provides perceptual aspects of human color vision, such as the extent to which viewing conditions of a color diverge from the corresponding physical measurement of the stimulus source. In some implementations, the method 600 includes mapping the image data based on user attributes, such as an eye gaze or head/body position associated with a user. In some implementations, the method 600 includes using eye gaze data to determine how long the user has been looking at a particular portion of the physical environment, and mapping the image data accordingly. For example, with reference to FIG. 3E, in response to determining that eye gaze data indicates that a user is gazing at the leftmost regions of the see-through display 314, the electronic device maps the first dog 222 at a higher resolution than the second dog 224 and the fire hydrant 226.

The present disclosure describes various features, no single one of which is solely responsible for the benefits described herein. It will be understood that various features described herein may be combined, modified, or omitted, as would be apparent to one of ordinary skill. Other combinations and sub-combinations than those specifically described herein will be apparent to one of ordinary skill, and are intended to form a part of this disclosure. Various methods are described herein in connection with various flowchart steps and/or phases. It will be understood that in many cases, certain steps and/or phases may be combined together such that multiple steps and/or phases shown in the flowcharts can be performed as a single step and/or phase. Also, certain steps and/or phases can be broken into additional sub-components to be performed separately. In some instances, the order of the steps and/or phases can be rearranged and certain steps and/or phases may be omitted entirely. Also, the methods described herein are to be understood to be open-ended, such that additional steps and/or phases to those shown and described herein can also be performed.

Some or all of the methods and tasks described herein may be performed and fully automated by a computer system. The computer system may, in some cases, include multiple distinct computers or computing devices (e.g., physical servers, workstations, storage arrays, etc.) that communicate and interoperate over a network to perform the described functions. Each such computing device typically includes a processor (or multiple processors) that executes program instructions or modules stored in a memory or other non-transitory computer-readable storage medium or device. The various functions disclosed herein may be implemented in such program instructions, although some or all of the disclosed functions may alternatively be implemented in application-specific circuitry (e.g., ASICs or FPGAs or GP-GPUs) of the computer system. Where the computer system includes multiple computing devices, these devices may be co-located or not co-located. The results of the disclosed methods and tasks may be persistently stored by transforming physical storage devices, such as solid-state memory chips and/or magnetic disks, into a different state.

Various processes defined herein consider the option of obtaining and utilizing a user's personal information. For example, such personal information may be utilized in order to provide an improved privacy screen on an electronic device. However, to the extent such personal information is collected, such information should be obtained with the user's informed consent. As described herein, the user should have knowledge of and control over the use of their personal information.

Personal information will be utilized by appropriate parties only for legitimate and reasonable purposes. Those parties utilizing such information will adhere to privacy policies and practices that are at least in accordance with appropriate laws and regulations. In addition, such policies are to be well-established, user-accessible, and recognized as in compliance with or above governmental/industry standards. Moreover, these parties will not distribute, sell, or otherwise share such information outside of any reasonable and legitimate purposes.

Users may, however, limit the degree to which such parties may access or otherwise obtain personal information. For instance, settings or other preferences may be adjusted such that users can decide whether their personal information can be accessed by various entities. Furthermore, while some features defined herein are described in the context of using personal information, various aspects of these features can be implemented without the need to use such information. As an example, if user preferences, account names, and/or location history are gathered, this information can be obscured or otherwise generalized such that the information does not identify the respective user.

The disclosure is not intended to be limited to the implementations shown herein. Various modifications to the implementations described in this disclosure may be readily apparent to those skilled in the art, and the generic principles defined herein may be applied to other implementations without departing from the spirit or scope of this disclosure. The teachings of the invention provided herein can be applied to other methods and systems, and are not limited to the methods and systems described above, and elements and acts of the various implementations described above can be combined to provide further implementations. Accordingly, the novel methods and systems described herein may be implemented in a variety of other forms; furthermore, various omissions, substitutions and changes in the form of the methods and systems described herein may be made without departing from the spirit of the disclosure. The accompanying claims and their equivalents are intended to cover such forms or modifications as would fall within the scope and spirit of the disclosure.

What is claimed:

1. A method comprising:
at an electronic device including one or more processors, a non-transitory memory, and a see-through display:
sensing a plurality of luminance values associated with ambient light from a physical environment, wherein the plurality of luminance values includes a first luminance value that quantifies a first amount of ambient light arriving at a first portion of the see-through display and a second luminance value that quantifies a second amount of ambient light arriving at a second portion of the see-through display, wherein the second amount of ambient light is less than the first amount of ambient light;
obtaining image data with a plurality of portions including a first portion that is to be displayed at the first portion of the see-through display and a second portion that is to be displayed at the second portion of the see-through display;
obtaining, via semantic segmentation, a plurality of semantic values respectively associated with the plurality of portions within the image data, wherein the plurality of semantic values includes a first semantic value identifying a first object represented by the first portion of the image data and a second semantic value identifying a second object represented by the second portion of the image data;
generating, based on the first luminance value and the first semantic value, a first mapped object corresponding to the first object; and
generating, based on the second luminance value and the second semantic value, a second mapped object corresponding to the second object, wherein the second mapped object has a greater luminance value than the second object in order to compensate for the second amount of light arriving at the second portion of the see-through display being less than the first amount of light arriving at the first portion of the see-through display.

2. The method of claim 1, wherein generating the first mapped object includes modifying the first portion of the image data that represents the first object.

3. The method of claim 2, wherein generating the second mapped object includes modifying the second portion of the image data that represents the second object.

4. The method of claim 3, wherein modifying the first portion of the image data and the second portion of the image data produces a threshold amount of contrast between the first portion of the image data and the second portion of the image data.

5. The method of claim 1, further comprising concurrently displaying the first mapped object at the first portion of the see-through display and the second mapped object at the second portion of the see-through display.

6. The method of claim 1, wherein the first mapped object and the second mapped object are a function of one or more display characteristics associated with the see-through display.

7. The method of claim 6, wherein the one or more display characteristics includes a luminance range associated with the see-through display.

8. The method of claim 1, wherein the first mapped object and the second mapped object are a function of a color appearance model.

9. The method of claim 1, wherein the first mapped object and the second mapped object are a function of user attributes.

10. The method of claim 1, further comprising:
determining first predetermined display characteristics of the first portion of the image data;
determining second predetermined display characteristics of the second portion of the image data; and
determining one or more display criteria associated with the see-through display.

11. The method of claim 10, wherein the first predetermined display characteristics of the first portion of the image data include a first luminance characteristic, wherein the second predetermined display characteristics of the second portion of the image data include a second luminance characteristic that is different from the first luminance characteristic, and wherein the one or more display criteria associated with the see-through display include a luminance criterion.

12. The method of claim 11, wherein mapping the image data generating the first mapped object and the second mapped object includes modifying the image data in order to generate modified image data, based on a function of the first luminance characteristic, the second luminance characteristic, and the luminance criterion.

13. The method of claim 12, wherein the modified image data includes a first modified portion corresponding to the first portion of the image data and a second modified portion corresponding to the second portion of the image data, wherein the first modified portion satisfies a luminance contrast threshold with respect to the second modified portion, and wherein the first and second modified portions together satisfy the luminance criterion.

14. The method of claim 1, wherein the first object and the second object represent a living object.

15. The method of claim 1, wherein the first object and the second object represent a face of a person.

16. A system comprising:
a see-through display, wherein the see-through display permits ambient light from a physical environment through the see-through display;
a sensor subsystem to:
sense a plurality of luminance values associated with the ambient light, wherein the plurality of luminance values includes a first luminance value that quantifies a first amount of ambient light arriving at a first portion of the see-through display and a second luminance value that quantifies a second amount of ambient light arriving at a second portion of the see-through display, wherein the second amount of ambient light is less than the first amount of ambient light; and
obtain image data with a plurality of portions including a first portion that is to be displayed at the first portion of the see-through display and a second portion that is to be displayed at the second portion of the see-through display;
a semantic values generator to generate, via semantic segmentation, a plurality of semantic values respectively associated with a plurality of portions within the image data, wherein the plurality of semantic values includes a first semantic value identifying a first object represented by the first portion of the image data and a second semantic value identifying a second object represented by the second portion of the image data; and an image data mapper to:

generate, based on the first luminance value and the first semantic value, a first mapped object corresponding to the first object; and generate, based on the second luminance value and the second semantic value, a second mapped object corresponding to the second object, wherein the second mapped object has a greater luminance value than the second object in order to compensate for the second amount of light arriving at the second portion of the see-through display being less than the first amount of light arriving at the first portion of the see-through display.

17. The system of claim 16, wherein generating the first mapped object includes modifying the first portion of the image data that represents the first object and generating the second mapped object includes modifying the second portion of the image data that represents the second object.

18. A non-transitory computer readable storage medium storing one or more programs, the one or more programs comprising instructions, which, when executed by an electronic device with one or processors and a see-through display, cause the electronic device to:

sense a plurality of luminance values associated with ambient light from a physical environment, wherein the plurality of luminance values includes a first luminance value that quantifies a first amount of ambient light arriving at a first portion of the see-through display and a second luminance value that quantifies a second amount of ambient light arriving at a second portion of the see-through display, wherein the second amount of ambient light is less than the first amount of ambient light;

obtain image data with a plurality of portions including a first portion that is to be displayed at the first portion of the see-through display and a second portion that is to be displayed at the second portion of the see-through display;

obtain, via semantic segmentation, a plurality of semantic values respectively associated with the plurality of portions within the image data, wherein the plurality of semantic values includes a first semantic value identifying a first object represented by the first portion of the image data and a second semantic value identifying a second object represented by the second portion of the image data;

generate, based on the first luminance value and the first semantic value, a first mapped object corresponding to the first object; and generate, based on the second luminance value and the second semantic value, a second mapped object corresponding to the second object, wherein the second mapped object has a greater luminance value than the second object in order to compensate for the second amount of light arriving at the second portion of the see-through display being less than the first amount of light arriving at the first portion of the see-through display.

19. The non-transitory computer readable storage medium of claim 18, wherein the instructions further cause the electronic device to concurrently display the first mapped object at the first portion of the see-through display and the second mapped object at the second portion of the see-through display.

20. The non-transitory computer readable storage medium of claim 18, wherein the first object and the second object are of the same object type.

21. The system of claim 16, wherein the first mapped object and the second mapped object are a function of a color appearance model.

22. The system of claim 16, wherein the first object and the second object represent a living object.

23. The non-transitory computer readable storage medium of claim 18, wherein the first mapped object and the second mapped object are a function of user attributes.

24. The non-transitory computer readable storage medium of claim 18, wherein the first object and the second object represent a face of a person.

* * * * *